US012123553B2

(12) United States Patent
Shao et al.

(10) Patent No.: US 12,123,553 B2
(45) Date of Patent: Oct. 22, 2024

(54) METHODS, INTERNET OF THINGS (IOT) SYSTEMS, AND MEDIA FOR PRESETTING EMERGENCY DEVICES OF SMART GAS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Quan Wang, Chengdu (CN); Guanghua Huang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/539,219

(22) Filed: Dec. 13, 2023

(65) Prior Publication Data

US 2024/0110674 A1 Apr. 4, 2024

(30) Foreign Application Priority Data

Oct. 24, 2023 (CN) ......................... 202311379875.2

(51) Int. Cl.
*F17D 5/00* (2006.01)
*G06Q 50/06* (2012.01)

(52) U.S. Cl.
CPC ............. *F17D 5/005* (2013.01); *G06Q 50/06* (2013.01)

(58) Field of Classification Search
None
See application file for complete search history.

(56) References Cited

U.S. PATENT DOCUMENTS 11,646,808 B2 * 5/2023 Cella ................... H04L 67/1097 702/188
2023/0079054 A1 * 3/2023 Mikhailov ........... G05D 1/0094 700/108
2023/0198234 A1 * 6/2023 Bertini ..................... G08B 7/06 700/282

FOREIGN PATENT DOCUMENTS

CN 103234116 10/2015
CN 107679776 A 2/2018

(Continued)

OTHER PUBLICATIONS

Sun, Xiao et al., Research on the Construction of Intelligent Gas Management Platform, Risk Management, 23-25, 2018.

(Continued)

*Primary Examiner* — Mohammad Ali
*Assistant Examiner* — Saad M Kabir
(74) *Attorney, Agent, or Firm* — METIS IP LLC

(57) ABSTRACT

The present disclosure provides a method, an Internet of Things (IoT) system, and a medium for presetting emergency devices of smart gas. The method comprises determining gas supply and demand features based on node data and downstream user features of a gas pipeline network. The method also comprises determining a plurality of gas emergency regions based on the gas supply and demand features, and continuously obtaining location data and carrying data of a plurality of emergency devices. The method further comprises determining a dynamic deployment scheme for the plurality of emergency devices based on the plurality of gas emergency regions, the location data, and the carrying data, the dynamic deployment scheme including locations of the plurality of emergency devices of at least one time point, generating a movement instruction based on the dynamic deployment scheme, and sending the movement instruction to the plurality of emergency devices.

6 Claims, 5 Drawing Sheets

(56) References Cited

FOREIGN PATENT DOCUMENTS

| | | | |
|---|---|---|---|
| CN | 108011365 | A | 5/2018 |
| CN | 110428085 | | 11/2019 |
| CN | 113507138 | A | 10/2021 |
| CN | 115587904 | | 1/2023 |
| CN | 115640914 | A | 1/2023 |
| CN | 116258347 | | 6/2023 |
| CN | 116645041 | | 8/2023 |
| CN | 116703651 | | 9/2023 |
| CN | 116739314 | | 9/2023 |

OTHER PUBLICATIONS

Xie, Yuxin et al., Construction of intelligent Gas Safety Management Platform, GAS & HEAT, 2019, 5 pages.
Yan, Rujing, Research on Supply and Demand Coordination Planning of Regional Integrated Energy System under Multiple Uncertainties, China Doctoral Dissertations Full-text Database, 2023, 162 pages.
Li, Shen, Study on Optimization of Urban Gas Pipe Network and Peak Shaving Program, Chinese Master's Theses Full-text Database, 2019, 71 pages.

* cited by examiner

METHODS, INTERNET OF THINGS (IOT) SYSTEMS, AND MEDIA FOR PRESETTING EMERGENCY DEVICES OF SMART GAS

CROSS-REFERENCE TO RELATED APPLICATIONS

This application claims priority of the Chinese Patent Application No. 202311379875.2, filed on Oct. 24, 2023, the entire contents of which are hereby incorporated by reference.

TECHNICAL FIELD

The present disclosure relates to the field of gas emergency devices, and in particular, to a method, an Internet of Things (IoT) system, and a medium for presetting emergency devices of smart gas.

BACKGROUND

The urban gas pipeline network is widely distributed, and when a fault occurs or a gas outage is carried out for maintenance, it will, to a certain extent, affect the gas consumption of gas users. Therefore, it requires a gas-based emergency gas supply device to temporarily satisfy the gas demand of gas users when the gas pipeline network is unable to adequately supply gas in time.

Aiming at the problem of emergency supply of gas in unexpected situations, the patent CN103234116B discloses a mobile system for emergency natural gas supply. The mobile system comprises a water-bath gasifier mounted on a skid-mounted vehicle, an air-temperature gasifier, and a natural gas inlet and outlet pipeline. The system is capable of providing a stable gas supply to users for a long period of time when the gas company repairs the pipeline network. But at present, it is usually only after a gas supply fault occurs that a device is urgently deployed from elsewhere to go to the area of the fault to provide emergency gas supply, and it often takes a certain period of time for temporary resumption of the gas supply from the time the shortage of gas supply begins to occur. If the fault occurs in a peak gas consumption period, it may not be able to fully meet the users' gas demand in time, which may cause more complaints from gas users.

Therefore, it is desirable to provide a method, an IoT system, and a medium for presetting emergency devices of smart gas to reasonably place an emergency gas supply device at a preset location, which helps to make timely dynamic deployment.

SUMMARY

One of the embodiments of the present disclosure provides a method for presetting emergency devices of smart gas. The method may be implemented by a smart gas pipeline network safety management platform of an Internet of Things (IoT) system of smart gas, comprising: determining gas supply and demand features based on node data and downstream user features of a gas pipeline network, the node data being obtained based on sensors; determining a plurality of gas emergency regions based on the gas supply and demand features; continuously obtaining location data and carrying data of a plurality of emergency devices, the plurality of emergency devices being distributed in a distributed manner; determining a dynamic deployment scheme for the plurality of emergency devices based on the plurality of gas emergency regions, the location data, and the carrying data, the dynamic deployment scheme including locations of the plurality of emergency devices of at least one time point; and generating a movement instruction based on the dynamic deployment scheme, and sending the movement instruction to the plurality of emergency devices.

One of the embodiments of the present disclosure provides an Internet of Things (IoT) system for emergency device management of smart gas. The IoT system may include a smart gas user platform, a smart gas service platform, a smart gas pipeline network safety management platform, a smart gas pipeline network sensor network platform, and a smart gas pipeline network object platform. The smart gas pipeline network safety management platform may be configured to: determine gas supply and demand features based on node data and downstream user features of a gas pipeline network, the node data being obtained based on sensors; determine a plurality of gas emergency regions based on the gas supply and demand features; continuously obtain location data and carrying data of a plurality of emergency devices, the plurality of emergency devices being distributed in a distributed manner; determine a dynamic deployment scheme for the plurality of emergency devices based on the plurality of gas emergency regions, the location data, and the carrying data, the dynamic deployment scheme including locations of the plurality of emergency devices of at least one time point; and generate a movement instruction based on the dynamic deployment scheme, and send the movement instruction to the plurality of emergency devices.

One of the embodiments of the present disclosure provides a non-transitory computer-readable storage medium, comprising computer instructions that, when read by a computer, may direct the computer to implement the method for presetting emergency devices of smart gas.

BRIEF DESCRIPTION OF THE DRAWINGS

The present disclosure is further illustrated in terms of exemplary embodiments, which will be described in detail with reference to the accompanying drawings. These embodiments are non-limiting exemplary embodiments, in which like reference numerals represent similar structures throughout the several views of the drawings, wherein.

DETAILED DESCRIPTION

Figure 1:
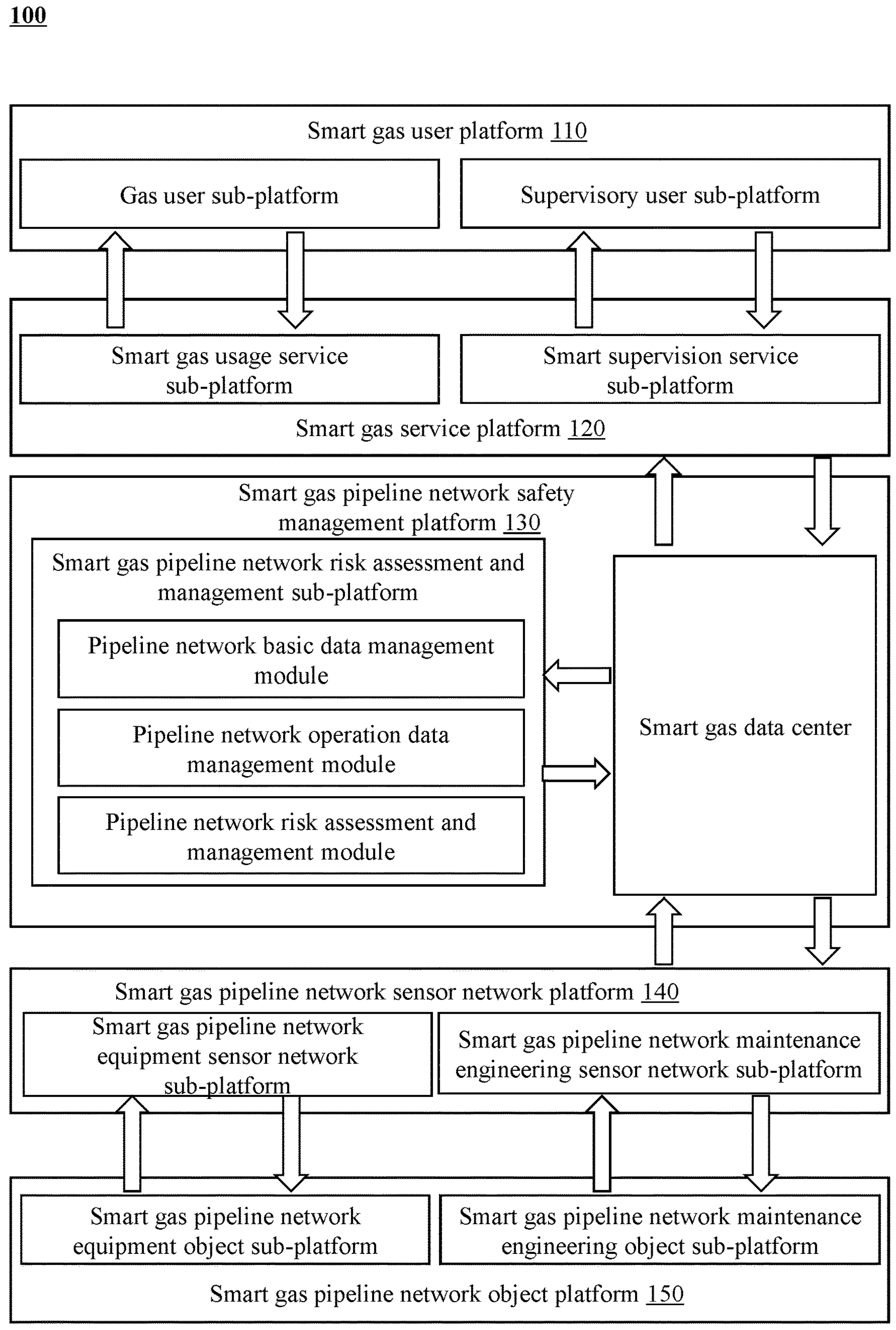
FIG. 1 is a diagram illustrating an exemplary platform structure of an Internet of Things (IoT) system platform of smart gas according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", "an" and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

In CN103234116B, the device for emergency gas supply is configured on a movable vehicle, and it takes a certain amount of time to complete the use of emergency gas supply, which is only applicable to a situation where a gas supply fault may occur. Scenarios/regions in which insufficient gas supply may occur during peak gas consumption and need to be supplied with gas in time are not considered.

Therefore, some embodiments of the present disclosure provide a method for presetting emergency devices of smart gas, which may determine gas emergency regions at different time points based on differences in the supply and demand of gas in different regions at different time periods, and determine a dynamic deployment scheme of devices for emergency gas supply of smart gas, thereby helping to resolve gas usage of the regions and users with gas supply shortage. The method is implemented by a smart gas pipeline network safety management platform of an Internet of Things (IoT) system of smart gas. The IoT system of smart gas can realize visualization of the data, and intuitively reflect supply and demand in different time periods based on the perceived data.

FIG. 1 is a diagram illustrating an exemplary platform structure of an Internet of Things (IoT) system of smart gas according to some embodiments of the present disclosure.

As shown in FIG. 1, the IoT system of smart gas may include a smart gas user platform 110, a smart gas service platform 120, a smart gas pipeline network safety management platform 130, a smart gas pipeline network sensor network platform 140, and a smart gas pipeline network object platform 150 which are connected in turn.

The smart gas user platform 110 refers to a platform for interacting with users. In some embodiments, the smart gas user platform 110 may be configured as a terminal device.

In some embodiments, the smart gas user platform 110 may include a gas user sub-platform and a supervisory user sub-platform.

The gas user sub-platform refers to a platform that provides gas users with data related to gas usage and solutions to gas problems. The gas users may be industrial gas users, commercial gas users, general gas users, etc.

The supervisory user sub-platform refers to a platform for supervisory users to supervise operation of the entire IoT system. Supervisory users may be personnel from a safety management department, etc.

The smart gas service platform 120 refers to a platform for receiving and transmitting data and/or information.

In some embodiments, the smart gas service platform 120 may include a smart gas usage service sub-platform and a smart supervision service sub-platform. The smart gas usage service sub-platform refers to a platform that provides the gas users with information related to gas equipment. The smart supervision service sub-platform refers to a platform that provides information related to safety supervision for the supervisory users.

In some embodiments, the sub-platforms of the smart gas service platform 120 may perform corresponding information interaction with the sub-platforms of the smart gas user platform 110.

The smart gas pipeline network safety management platform 130 refers to a platform that integrates and coordinates linkages and collaborations between various functional platforms.

In some embodiments, the smart gas pipeline network safety management platform 130 may include a smart gas data center and a smart gas pipeline network risk assessment and management sub-platform.

The smart gas data center may be configured to store and manage operation data. In some embodiments, the smart gas data center may be configured as a storage device for storing and managing location data and carrying data of emergency devices.

In some embodiments, the smart gas pipeline network risk assessment and management sub-platform may include, but is not limited to, a pipeline network basic data management module, a pipeline network operation data management module, and a pipeline network risk assessment and management module.

The pipeline network basic data management module may be configured to manage basic data information of a gas pipeline network, such as an environment of the pipeline network, an age of the pipeline network, a material of the pipeline network, or the like.

The pipeline network operation data management module may be configured to manage operation data information of the gas pipeline network, such as pipeline network pressure, leakage data, a maintenance situation, or the like.

The pipeline network risk assessment and management module may be configured to determine a dynamic deployment scheme of emergency gas supply devices based on a gas emergency supply region, location data and carrying data of the emergency devices, and generate a movement instruction.

More descriptions regarding determining the gas emergency regions, the dynamic deployment scheme, and the movement instruction may be found in FIGS. 2-5 and the related descriptions thereof.

The smart gas pipeline network sensor network platform 140 refers to a functional platform for managing sensor communication. In some embodiments, the smart gas pipeline network sensor network platform 140 may be configured as a communication network and a gateway.

In some embodiments, the smart gas pipeline network sensor network platform 140 may include a smart gas pipeline network equipment sensor network sub-platform and a smart gas pipeline network maintenance engineering sensor network sub-platform.

The smart gas pipeline network equipment sensor network sub-platform may be configured to receive node data and downstream user features sent by the smart gas pipeline device object sub-platform and upload the node data and the downstream user features to the smart gas data center.

The smart gas pipeline network maintenance engineering sensor network sub-platform may be configured to receive the movement instruction issued by the smart gas data center and transmit the movement instruction to the smart gas pipeline network maintenance engineering object sub-platform.

The smart gas object platform 150 refers to a functional platform for obtaining perceptional information. In some embodiments, the smart gas object platform 150 may be configured as various types of pipeline network equipment, such as a pipeline, a flow meter, monitoring equipment (e.g., a pressure gauge, and a sensor), or the like.

In some embodiments, the smart gas object platform 150 may include a smart gas pipeline network equipment object sub-platform and a smart gas pipeline network maintenance engineering object sub-platform.

The smart gas pipeline network equipment object sub-platform may send the node data and the downstream user feature of the gas pipeline network to the smart gas pipeline network sensor network sub-platform.

The smart gas pipeline network maintenance project object sub-platform may receive the movement instruction sent by the smart gas pipeline network maintenance engineering sensor network sub-platform and send the movement instruction to the emergency devices.

In some embodiments, the smart gas pipeline network safety management platform 130 may perform information interaction with the smart gas service platform 120 and the smart gas pipeline network sensor network platform 140 through the smart gas data center. For example, the smart gas data center may receive the movement instruction sent by the pipeline network risk assessment and management module and transmit the movement instruction to the smart gas pipeline network sensor network platform 140.

It should be noted that the above descriptions of the IoT system of smart gas and the constituent units are provided only for descriptive convenience, and does not limit the present disclosure to the scope of the cited embodiments. It is to be understood that for those skilled in the art, after understanding the principle of the system, it may be possible to arbitrarily combine individual modules or constitute a sub-system to be connected to other modules without departing from the principle.

Figure 2:
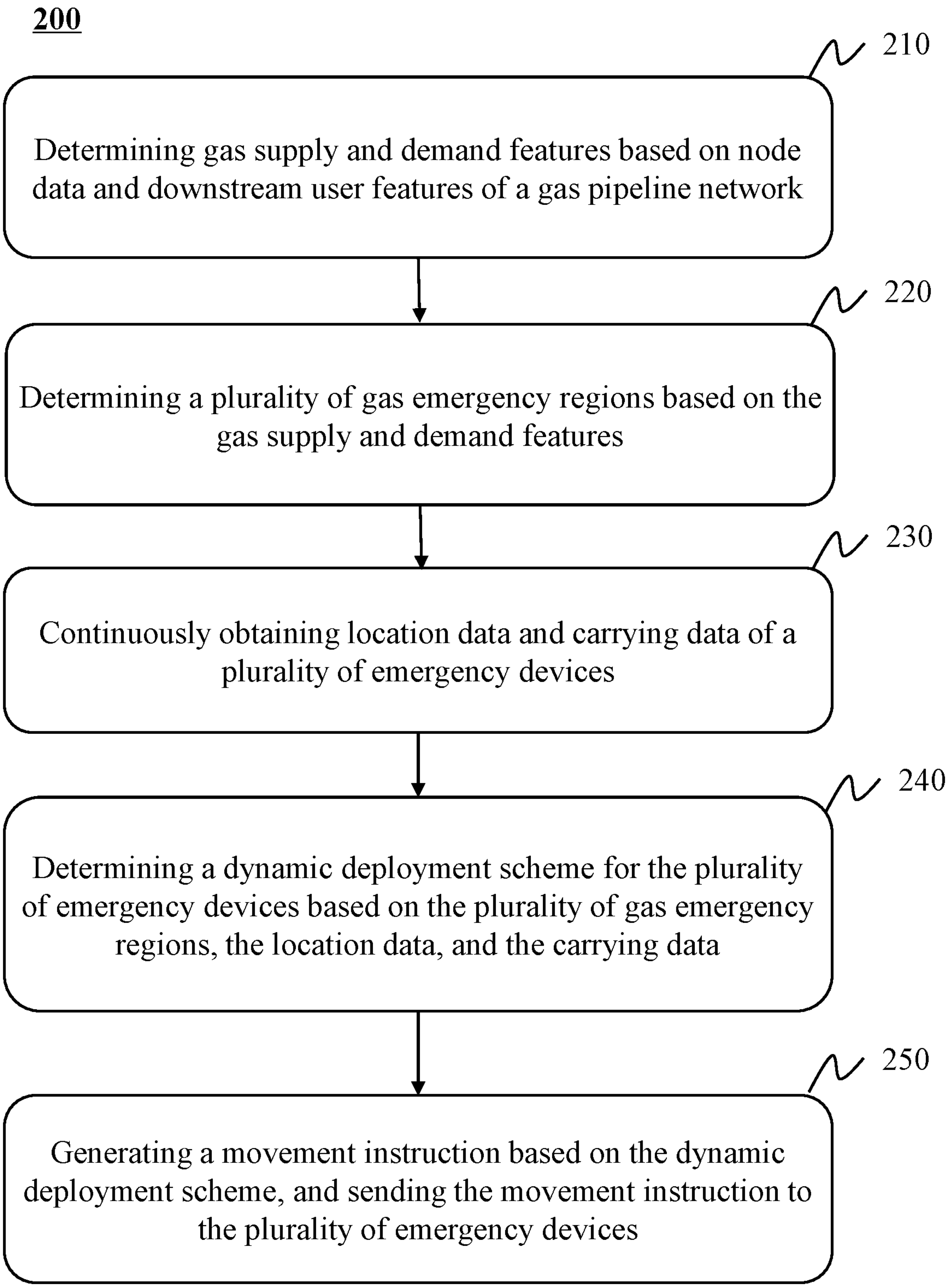
FIG. 2 is a flowchart illustrating an exemplary method for presetting emergency devices of smart gas according to some embodiments of the present disclosure.

FIG. 2 is a flowchart illustrating an exemplary method for presetting emergency devices of smart gas according to some embodiments of the present disclosure. In some embodiments, a process 200 may be performed based on the smart gas pipeline network safety management platform 130 of an IoT system of smart gas. As shown in FIG. 2, the process 200 may include the following operations.

In 210, gas supply and demand features may be determined based on node data and downstream user features of a gas pipeline network.

The gas pipeline network refers to a network structure consisting of gas pipelines of various pressure levels and branches thereof. The node data represents data related to gas features of each node in the gas pipeline network. For example, the node data may include pressure, temperature, flow rate, or the like, at different locations of the gas pipeline network. In some embodiments, the node data may be obtained through sensors of the smart gas pipeline network equipment object sub-platform.

A node in the gas pipeline network refers to a position that requires focused monitoring. For example, nodes of the gas pipeline network may include locations of the gas network that require focused monitoring, such as an entry point of the gas pipeline network, an inflection point of the gas pipeline network, a link points of the gas pipeline network, a gas outlet, etc.

In some embodiments, the downstream user features refer to feature data that reflects usage of gas by downstream users. The downstream users may include residential users, industrial users, commercial users, etc. The downstream user features may include gas usage time of users, a usage volume, gas pressure at the entry point, etc. In some embodiments, the downstream user features may be obtained through the smart gas pipeline network equipment object sub-platform.

The gas supply and demand features are feature parameters that represent a gas supply and demand situation. For example, the gas supply and demand features may include a difference between the gas supply and the gas demand.

When the gas supply and demand situation changes, the pressure of the gas pipeline network may also change. For example, when the gas supply meets the gas demand of users, the pressure of the gas pipeline network may remain relatively stable. When the gas supply exceeds the gas demand, the pressure of the corresponding gas pipeline may gradually decrease.

Therefore, the gas supply and demand features may also include a pressure change of the gas pipeline network. For example, the gas supply and demand features may include at least one of a branch pressure of the gas pipeline network on at least one continuous time point, a change rate of the branch pressure of the gas pipeline network, and a duration of reduction in gas pressure.

In some embodiments, the smart gas pipeline network safety management platform 130 may determine the gas supply and demand features of a region based on a change trend in the node data and the downstream user features of the gas pipeline network in the region during a time period. For example, gas supply features may be determined based on the node data, gas demand features may be determined based on the downstream user features, and the gas supply and demand features may be determined based on a difference between the gas supply features and the gas demand features. As another example, the pressure change in the gas pipeline network may be determined based on the node data and the downstream user features corresponding to the at least one continuous time point, and the gas supply and demand features may be determined based on the pressure change.

In 220, a plurality of gas emergency regions may be determined based on the gas supply and demand features.

The gas emergency regions refer to regions where emergency gas supply is required. For example, the gas emergency regions may include residential areas, commercial neighborhoods, and/or industrial areas, etc., that require emergency gas supply at different time points.

In some embodiments, the smart gas pipeline network risk assessment and management sub-platform may determine the gas emergency regions in various ways. For example, the smart gas pipeline network risk assessment and management sub-platform may determine the gas emergency regions by determining whether the gas supply and demand features of different regions reach a preset threshold.

In some embodiments, the smart gas pipeline network risk assessment and management sub-platform may determine a plurality of gas emergency regions based on a regional division of the gas pipeline network and the gas supply and demand features. More descriptions may be found in FIG. 3 and related descriptions thereof.

In 230, location data and carrying data of a plurality of emergency devices may be continuously obtained.

The emergency devices refer to devices used for emergency gas supply. For example, the emergency devices may include a gas supply tank, etc. In some embodiments, the plurality of the emergency devices may be arranged in a distributed manner. In some embodiments, the emergency devices may be transported to a specified location by a vehicle.

The location data refers to data reflecting locations of the emergency devices. For example, the location data may include locations of vehicles in which the emergency devices are located. The carrying data refers to data reflecting carriage of the emergency devices. For example, the carrying data may include gas supply capacities of the emergency devices.

In some embodiments, the smart gas pipeline network maintenance engineering object sub-platform may remotely obtain the location data and the carrying data from positioning devices and sensors placed on the emergency devices.

In 240, a dynamic deployment scheme for the plurality of emergency devices may be determined based on the plurality of gas emergency regions, the location data, and the carrying data.

The dynamic deployment scheme refers to a program for deploying the plurality of the emergency devices. For example, the dynamic deployment scheme may include a method for presetting emergency devices of gas (e.g., presetting time and presetting locations, etc.). In some embodiments, the dynamic deployment scheme may include locations of the emergency devices on at least one time point.

In some embodiments, the smart gas pipeline network safety management platform 130 may determine the dynamic deployment scheme in various ways. For example, the smart gas pipeline network safety management platform 130 may determine the dynamic deployment scheme based on the plurality of gas emergency regions, the location data, and the carrying data based on preset rules. For example, the preset rules may include determining, based on the locations of the gas emergency regions and the location data of the gas emergency devices, candidate gas emergency devices that may reach the gas emergency regions within a desired time, and deploying the candidate gas emergency devices of which carrying data satisfies a gas supply condition to the gas emergency regions.

In some embodiments, the smart gas pipeline network safety management platform 130 may determine the dynamic deployment scheme for the emergency devices based on weighted distances between different gas emergency regions and device data of the emergency devices. More descriptions may be found in FIG. 4 and related descriptions thereof.

In some embodiments, the smart gas pipeline network safety management platform 130 may determine the dynamic deployment scheme based on gas placement locations and device data through a device deployment model. More descriptions may be found in FIG. 5 and related descriptions thereof.

In 250, a movement instruction may be generated based on the dynamic deployment scheme, and the movement instruction may be sent to the plurality of emergency devices.

The movement instruction refers to an instruction directing the emergency devices to move. For example, the movement instruction may include movement time and movement locations of the emergency devices, etc.

In some embodiments, the movement instruction may be generated by the smart gas pipeline network safety management platform 130 based on the dynamic deployment scheme. For example, the smart gas pipeline network safety management platform 130 may determine, based on the dynamic deployment scheme, a target gas emergency device that needs to move, and a movement destination and movement time of the gas emergency device. The smart gas pipeline network safety management platform 130 may generate, at least based on the movement destination and the movement time, the movement instruction, and send the movement instruction to the target gas emergency device.

In some embodiments, the smart gas pipeline network safety management platform 130 may send the movement instructions to different smart gas pipeline network maintenance engineering object sub-platforms; and then the gas pipeline network maintenance engineering object sub-platforms may send the movement instruction to the corresponding emergency devices.

In some embodiments of the present disclosure, determining the gas emergency regions that may exist at different time points by means of the gas supply and demand features, and determining the corresponding dynamic deployment scheme for the emergency devices can make the limited count of emergency devices be preconfigured at locations where insufficient gas supply may occur, and provide emergency gas supply to the gas emergency regions in time in case of insufficient gas supply, thereby effectively avoiding the problem of the emergency devices being dispatched too late, and guaranteeing the gas supply in time.

Figure 3:
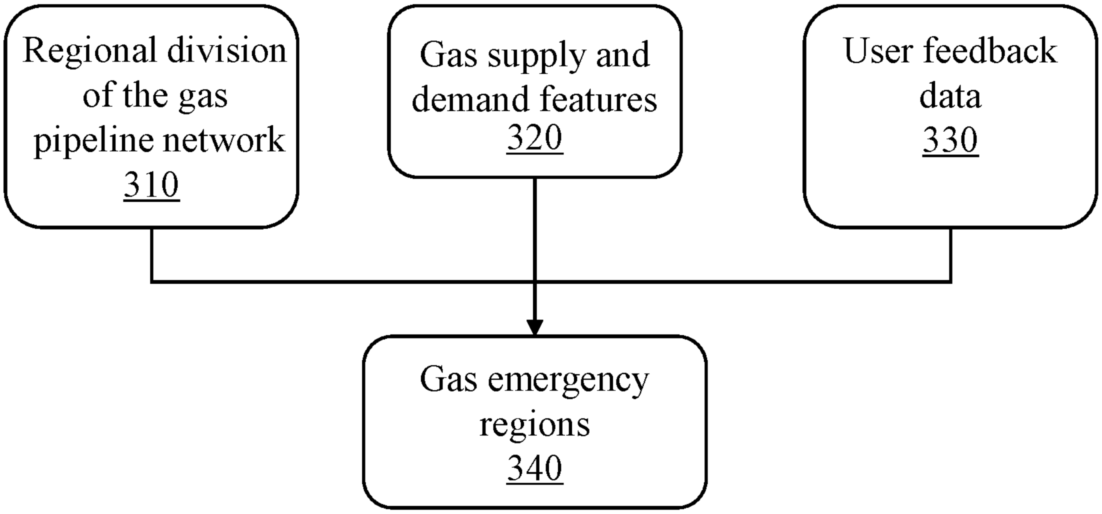
FIG. 3 is a schematic diagram illustrating a process for determining gas emergency regions according to some embodiments of the present disclosure.

It should be noted that the foregoing description of the process is for the purpose of exemplification and illustration only and does not limit the scope of application of the present disclosure. For those skilled in the art, various corrections and changes to the process may be made under the guidance of the present disclosure. However, these corrections and changes remain within the scope of the present disclosure. FIG. 3 is a schematic diagram illustrating an exemplary process for determining gas emergency regions according to some embodiments of the present disclosure.

In some embodiments, the smart gas pipeline network safety management platform 130 may determine a regional division 310 of the gas pipeline network, and determine a plurality of gas emergency regions 340 based on the regional division and gas supply and demand features 320.

More descriptions regarding the gas supply and demand features may be found in FIG. 2 and related descriptions thereof.

The regional division refers to a result of dividing the gas pipeline network. The regional division of the gas pipeline network may include at least one sub-region. The sub-region may include a region where at least one gas pipeline segment within the gas pipeline network is located.

In some embodiments, the smart gas pipeline network safety management platform 130 may determine the regional division of the gas pipeline network based on a size of a preset grid. The size of the preset grid may be determined based on experience. In some embodiments, the size of the grid may be selected based on actual needs. The smaller the grid, the greater the count of sub-regions into which the gas pipeline network is divided.

In some embodiments, the smart gas pipeline network safety management platform 130 may also divide the gas pipeline network based on a map corresponding to the gas pipeline network, for example, by drawing a dividing line along a roadway to divide the gas pipeline network into a plurality of sub-regions. In some embodiments, the regional division may be performed based on one or more parameters to divide the gas pipeline network into at least two sub-regions, such as an area size, a population density, an administrative division, an office building density, a residential building density, vertical and latitudinal coordinates, or the like, or any combination thereof. In some embodiments, the smart gas pipeline network safety management platform 130 may also determine the regional division of the gas pipeline network in other ways.

The gas emergency regions 340 may be determined in various ways. In some embodiments, the smart gas pipeline network safety management platform 130 may analyze the gas supply and demand features of each sub-region separately. When the gas supply and demand features of the sub-region meet a preset condition, the sub-region may be determined as the gas emergency region 340.

The preset condition may be a determination condition for evaluating whether the sub-region is the gas emergency region 340. For example, the preset condition may include that pressure of a gas pipeline segment of the sub-region on at least one continuous time point is lower than a preset threshold, etc. The pressure of the gas pipeline segment refers to an average value of pressures of all gas pipeline segments of the sub-region.

By determining the gas emergency regions 340, it is possible to deploy the emergency devices to the sub-regions in advance according to the dynamic deployment scheme when there is insufficient gas supply in certain sub-regions, avoiding safety hazards caused by directly increasing the pressure of the gas pipeline network, and reducing loss of gas caused by other majeure factors of the gas pipeline network due to high pressure.

In some embodiments, the gas supply and demand features may include a pressure change of the gas pipeline network of at least one continuous time point. The smart gas pipeline network safety management platform 130 may determine the gas emergency regions 340 corresponding to the at least one time period based on the pressure change of the gas pipeline network of the at least one continuous time point.

The pressure change of the gas pipeline network is used to characterize a pressure change over time within the gas pipeline segment. In some embodiments, the pressure change of the gas pipeline network may be represented by a vector as (A1, A2, A3, . . . ), wherein A1, A2, and A3 represent pressures of the gas pipeline segment at different time points, respectively.

In some embodiments, the pressure change of the gas pipeline network may include a pressure change rate, an amount of pressure change, a pressure reduction duration, etc. of the at least one continuous time point.

The pressure change rate refers to a rate at which the pressure changes relative to time. The amount of pressure change refers to a difference between a maximum value and a minimum value of the pressure over a time period. The pressure reduction duration refers to time during which the pressure continues to decrease.

In some embodiments, the smart gas pipeline network safety management platform 130 may determine the pressure change of the gas pipeline network in various ways. For example, the smart gas pipeline network safety management platform 130 may obtain the pressure change of the gas pipeline network based on a preset time by obtaining pressures of a plurality of continuous time points within the preset time through the smart gas pipeline network sensor network platform 140.

The preset time refers to a historical time period before current time.

The continuous time points refer to a plurality of continuous time points of a certain interval duration. The continuous time points may be historical time points when the gas is used.

The interval duration may be any duration, which may be determined according to the actual demand. For example, the interval duration may be one minute, ten minutes, etc.

In some embodiments, the continuous time points may be determined based on factors such as a peak period and an off-peak period of gas usage and seasons. For example, the continuous time points during the peak period of gas usage may be more closely spaced. Similarly, the continuous time points during the winter season may be more closely spaced. The peak period refers to a time period during the day when the amount of gas used exceeds a gas peak threshold. The off-peak period refers to a time period during the day when the amount of gas used is less than a gas trough threshold. The gas peak threshold and the gas trough threshold may be determined based on historical gas usage during a same time period.

The time period is a period of time that corresponds to at least one continuous time point. For example, if the continuous time points are historical 0:30, 1:30, 2:30, etc., the corresponding time periods may be 0:00-1:00, 1:00-2:00, 2:00-3:00, etc. in the future.

In some embodiments, the smart gas pipeline network safety management platform 130 may determine, based on the pressure change of the gas pipeline network of the at least one continuous time point, the gas emergency regions 340 corresponding to the at least one time period in various ways. For example, the smart gas pipeline network safety management platform 130 may determine the sub-region as the gas emergency region 340 in the at least one time period based on that the pressure change rate, the amount of pressure change, and the pressure reduction duration of the gas pipeline segment of the sub-region are greater than thresholds corresponding to the pressure change rate, the amount of pressure change, and the pressure reduction duration of the gas pipeline segment of the sub-region, respectively. The corresponding thresholds may be system defaults, manually preset values, etc.

It should be noted that the determined gas emergency regions of different time periods may be different. For example, the gas emergency regions in the morning may be four regions A, B, C, and D, and in the afternoon, the gas emergency regions may be six regions C, D, E, F, H, and J.

In some embodiments, the smart gas pipeline network safety management platform 130 may determine an assessment value of the sub-region based on the pressure change rate, the amount of pressure change, and the pressure change duration, and determine the sub-region of which the assessment value satisfies an emergency condition as the gas emergency region 340. The emergency condition may include that the assessment value is greater than a preset threshold. The preset threshold may be a system default value, or a manually preset value.

In some embodiments, the assessment value of the sub-region may be determined based on formula (1):

$$E=\alpha_1 P+\alpha_2 V+\alpha_3 T \quad (1)$$

wherein E denotes the assessment value of the sub-region, $\alpha_1$, $\alpha_2$, and $\alpha_3$ denote assessment weights, P denotes the pressure change rate, V denotes the amount of pressure change, and T denotes the pressure change duration.

In some embodiments, the assessment weights may be positively correlated with user features, historical complaint data, historical gas supply fault data of the sub-region, etc. For example, the more important the users of the sub-region, the greater the assessment weight; the greater the amount of historical complaint data, the greater the number of times of faults indicated by the historical gas supply fault data, and the greater the corresponding assessment weight. The greater the assessment weight, the higher the emergency response urgency of the sub-region.

In some embodiments, the smart gas pipeline network safety management platform 130 may adjust the assessment weights $\alpha_1$, $\alpha_2$, and $\alpha_3$ based on the actual demand to obtain adjusted assessment weights $\alpha_{1'}$, $\alpha_{2'}$, and $\alpha_{3'}$. For example, for a sub-region A, where the focus should be on the pressure change duration, the smart gas pipeline network safety management platform 130 may increase the value of a 3 based on the actual demand. As another example, for a sub-region B, the amount of pressure change may have less impact on the urgency of emergency response, then the smart gas pipeline network safety management platform 130 may reduce the value of a 2 based on the actual demand.

The user features refer to features of gas users of the sub-region. For example, the user features may include types of gas users, a count of gas users, etc. The types of gas users may include residential users, commercial users (e.g., a refueling station, a natural gas power plant, etc.), and industrial users (e.g., a factory that requires gas), etc.

In some embodiments, the types of gas uses may be determined based on a supply address corresponding to the gas pipeline segment. For example, the type of gas user corresponding to the gas pipeline segment with a supply address of a community may be determined as the residential user. It should be noted that different types of gas uses may correspond to different types of gas pipeline segments.

The historical complaint data refer to complaint data on insufficient gas supply reported by gas users during historical usage of natural gas. The historical gas supply fault data refers to data on a gas supply fault that occurs during historical gas transportation.

In some embodiments, the gas emergency regions 340 may also be related to user feedback data 330.

The user feedback data 330 refers to information related to gas usage reported by the gas users. For example, the user feedback data 330 may include complaints from the gas users about insufficient gas supply, feedback on gas usage experiences, etc.

In some embodiments, the gas users may send the user feedback data 330 to the smart gas service platform 120 through the smart gas user platform 110. Then the smart gas service platform 120 may send the user feedback data 330 to the smart gas pipeline network safety management platform 130 for aggregation, processing, and other related operations.

In some embodiments, a possibility that a certain sub-region is determined as the gas emergency region may be positively correlated with the amount of the user feedback data 330. For example, the more the user feedback data 330 of the certain sub-region, the greater the possibility that the sub-region is determined as the gas emergency region 340.

In some embodiments of the present disclosure, the user feedback is considered to ensure that the determined gas emergency region is more in line with the practical situation of gas usage, thereby improving the accuracy of the determined gas emergency region and facilitating the subsequent dynamic deployment scheme based on the actual practical situation according to the gas emergency region.

In some embodiments of the present disclosure, there may be differences in gas supply and demand in different sub-regions at different time periods (e.g., some sub-regions may have insufficient gas supply at midday, and some sub-regions may have insufficient gas supply at night). By determining the gas emergency region in line with the practical situation, the limited count of emergency devices may be configured in the reasonable locations in advance, so that the gas emergency region can be supplied with emergency gas during the corresponding time period, thereby meeting the needs of different users.

In some embodiments of the present disclosure, the plurality of gas emergency regions of the gas pipeline network can be determined through the regional division and the gas supply and demand features, so that the dynamic deployment scheme can be rapidly obtained, the emergency device can be deployed in the gas emergency regions in advance to avoid the impact of insufficient gas supply on the gas users, thereby balancing the demand for gas supply, and guaranteeing normal gas supply.

Figure 4:
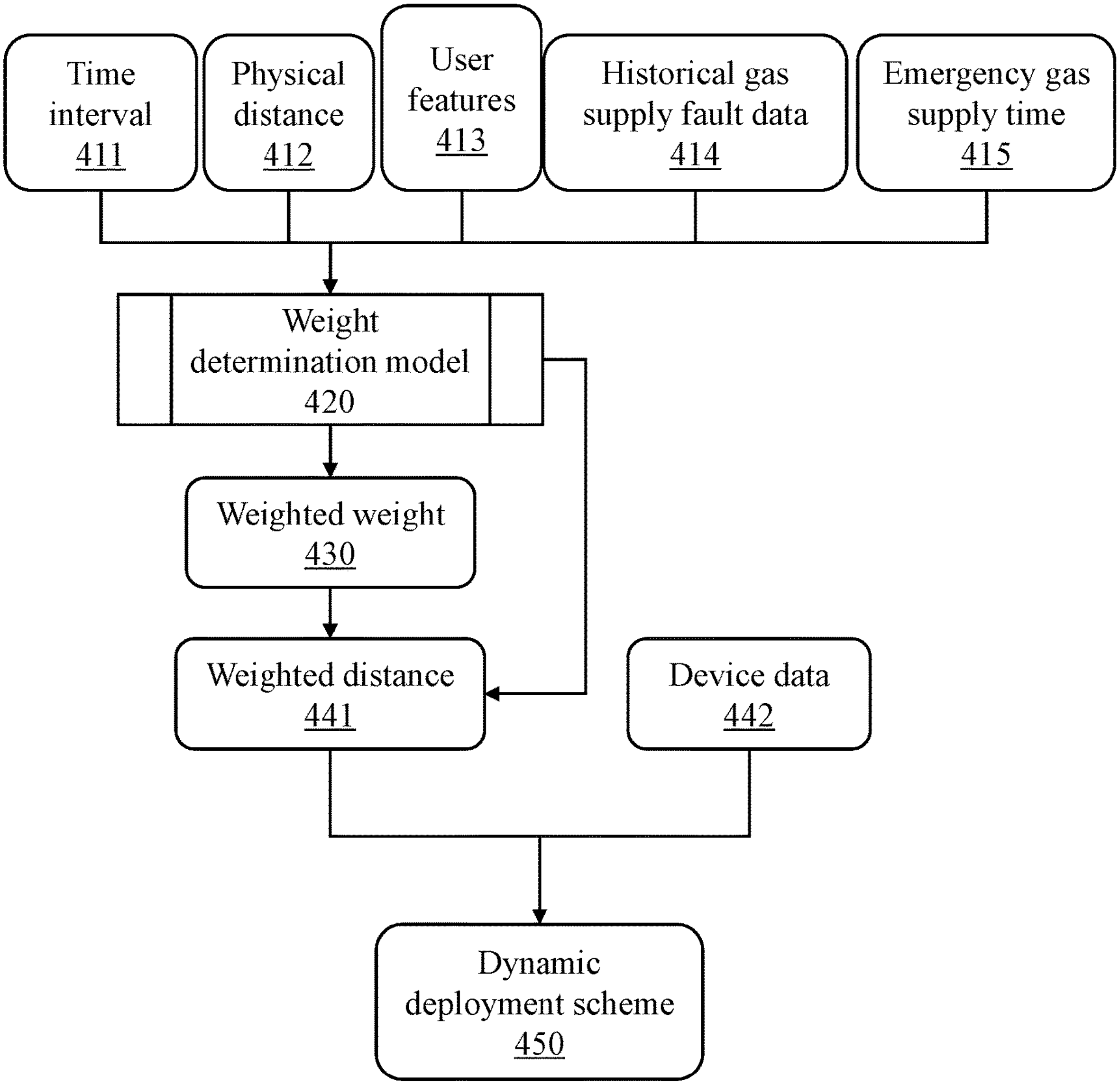
FIG. 4 is a schematic diagram illustrating a process for determining a dynamic deployment scheme according to some embodiments of the present disclosure.

FIG. 4 is a schematic diagram illustrating a process for determining a dynamic deployment scheme according to some embodiments of the present disclosure.

In some embodiments, the smart gas pipeline network safety management platform 130 may determine weighted distances 441 between different gas emergency regions; and determine a dynamic deployment scheme 450 for the plurality of emergency devices based on the weighted distances 441 and device data 442 of the plurality of emergency devices.

More descriptions regarding the gas emergency regions may be found in FIG. 3 and related descriptions thereof.

The weighted distances 441 may be used to measure a correlation between different gas emergency regions. For example, the larger the weighted distance 441 between a gas emergency region A and a gas emergency region B, the smaller the correlation between the gas emergency region A and the gas emergency region B.

In some embodiments, the weighted distance 441 may be determined in various ways. For example, the weighted distance 441 may be obtained through prior knowledge. The smart gas pipeline network safety management platform 130 may preset the weighted distances 441 between different gas emergency regions based on the prior knowledge according to different scenarios. For example, the greater the physical distance between two gas emergency regions and the longer the time interval between the occurrence of gas emergency situations, the larger the weighted distance between the two gas emergency regions.

In some embodiments, the smart gas pipeline network safety management platform 130 may determine the weighted distances 441 of time intervals 411 and physical distances 412 of different gas emergency regions based on the gas emergency regions of different time points.

The time interval 411 refers to a time interval at which the gas emergency situations may occur in different gas emergency regions. In some embodiments, the smart gas pipeline network safety management platform 130 may determine the time interval 411 based on time at which the gas emergency situations occur in the different gas emergency regions.

The gas emergency situation refers to an emergency situation that affects or may affect the normal use of gas users due to insufficient or interrupted gas supply, and requires emergency measures.

The physical distance 412 refers to a route distance between different gas emergency regions, i.e., a distance along the street or road on the surface of the earth between different gas emergency regions. For example, the physical distance 412 may include a relative distance in latitude, longitude, coordinates, etc. between different gas emergency regions. In some embodiments, the smart gas pipeline network safety management platform 130 may identify the physical distances 412 between different gas emergency regions based on the latitudes and the longitudes of the different gas emergency regions through analysis and processing of third-party software.

In some embodiments, the smart gas pipeline network safety management platform 130 may determine the weighted distance 441 between a current gas emergency region and a next gas emergency region by weighting and summing the time interval 411 and the physical distance 412 of the current gas emergency region and the next gas emergency region based on weighted weights 430. The current gas emergency region refers to a gas emergency region where the gas emergency device is located, and the next gas emergency region refers to any gas emergency region that the emergency device needs to be deployed.

The weighted weight 430 refers to a weighting coefficient corresponding to the time interval and the physical distance.

In some embodiments, the weighted weight 430 may be determined based on preset rules.

Merely by way of example, the preset rules may be that the longer emergency gas supply time 415 in the current gas emergency region, the longer the emergency device needs to stay in the current gas emergency region, the later the emergency device travels from the current gas emergency region to the next gas emergency region, and the greater the weighted weight 430 corresponding to the time interval at this time. The higher the importance of the gas use corresponding to the next gas emergency region, the higher the need to prioritize the emergency response of the gas use. At this time, the influence of the physical distance may be less considered, and the users with higher degree of importance may be supplied with gas as soon as possible regardless of distance. Accordingly, the higher the importance of the gas user, the smaller the weighted weight 430 corresponding to the physical distance.

The emergency gas supply time 415 refers to predicted information related to the time for the emergency device to perform emergency gas supply. For example, the emergency gas supply time 415 may include a start time when the emergency gas supply is required, a duration of the emergency gas supply, etc. In some embodiments, the smart gas pipeline network safety management platform 130 may determine the current emergency gas supply time 415 based on a duration of the emergency device used in the gas emergency region during a same historical period.

The degree of importance of gas users is used to characterize a degree of importance of gas users in the gas emergency regions. The degree of importance of gas users may vary from one gas emergency region to another. In some embodiments, the smart gas pipeline network safety management platform 130 may perform statistical analysis (e.g., a statistical period may be the past week/month, etc.) on historical gas supply data of the gas pipeline network, determine a correspondence between different gas emergency regions and the degree of importance of different gas users based on gas consumption of users of different regions, and determine a user level reference table based on the correspondence. In some embodiments, the smart gas pipeline network safety management platform 130 may determine the degree of importance of the gas user based on the gas emergency region by querying the user level reference table.

In some embodiments, the smart gas pipeline network safety management platform 130 may determine the weighted distance 441 between two gas emergency regions based on the physical distance 411 between the two gas emergency regions and the time interval 412 required for emergency response, the user features 413, the historical gas supply fault data 414, and the emergency gas supply time 415 through the weight determination model 420.

The emergency response refers to increasing gas supply to the gas emergency region through the deployment of the emergency device.

The weight determination model 420 may be configured to determine the weighted distance. In some embodiments, the weight determination model 420 may be a machine learning model such as a deep neural network model.

The user features 413 are configured to reflect features of gas users. For example, the user features may include a type and a degree of importance of the gas user. In some embodiments, the user features 413 may include user features of each of the two gas emergency regions for which a weighted distance is to be determined.

The historical gas supply fault data 414 refers to data related to gas supply faults during historical gas supply. In some embodiments, the historical gas supply fault data 414 may include historical fault records of each of the two gas emergency regions for which the weighted distance is to be determined.

In some embodiments, the weight determination model 420 may be trained based on a large number of first training samples with first labels. In some embodiments, the first training samples may include sample physical distances and sample time intervals of a plurality of sets of sample gas emergency regions, sample user features corresponding to each set of sample gas emergency regions, sample historical gas supply fault data, and sample emergency gas supply time. The first training samples may be obtained from historical data. Each set of sample gas emergency regions may include two sample gas emergency regions for which a weighted distance is to be determined.

In some embodiments, the first labels may be the weighted distances between different sample gas emergency regions. The first labels may be determined by the smart gas pipeline network safety management platform 130. For example, historical dynamic deployment records may be determined by performing statistical analysis on historical gas supply records. Historical placement locations of the emergency devices may be determined based on the historical dynamic deployment records. Historical weighted distances may be inversely induced by software simulation or other approaches based on the historical placement locations, which are then determined as the first labels.

In some embodiments, the smart gas pipeline network safety management platform 130 may train the weight determination model based on the plurality of first training samples with the labels. For example, the plurality of first training samples may be input into an initial weight determination model. A loss function may be constructed based on output results of the initial weight model and the first labels, and parameters of the initial weight model may be updated based on the loss function through gradient descent or other approaches. The training may be completed when a training end condition is satisfied, and a trained weight determination model may be obtained. The training end condition may include that the loss function converges, a count of iterations reaches a threshold, etc.

In some embodiments, the weighted weights 430 may be determined based on the trained weight determination model 420. For example, the smart gas pipeline network safety management platform 130 may determine the weighted weights based on the weighted distances output by the weight determination model 420 and processed by software simulation, etc. In some embodiments of the present disclosure, determining the weighted weights of the gas emergency regions using the weight determination model can obtain more accurate results than those determined manually, saving costs and resources, and facilitating the further determination of the dynamic deployment scheme, thereby better meeting the user gas demand, improving gas user satisfaction, and effectively reducing user complaints.

In some embodiments of the present disclosure, the weighted distances may be comprehensively determined by the physical distances and the time intervals, to ensure that the calculated weighted distances are more in line with the actual gas supply situation, improving the accuracy of the subsequently determined dynamic dispatch scheme for the emergency devices.

The device data 442 of the emergency devices refers to data related to the emergency devices. For example, the device data 442 of the emergency devices may include locations and gas supply capacities of the emergency devices. The locations of the emergency devices refer to geographical locations of the emergency devices. The gas supply capacities refer to the amount of gas that the emergency devices can provide.

The device data 442 of the emergency devices may be obtained in various ways. For example, the smart gas pipeline network safety management platform 130 may obtain the locations of the emergency devices through positioning technology embedded in the emergency devices. The positioning technology may include one of the Global Positioning System (GPS), Global Navigation Satellite System (GLONASS), Wireless Fidelity (Wi-Fi) positioning technology, or the like, or any combination thereof. The smart gas pipeline network safety management platform 130 may also determine the gas supply capacities of the emergency devices through a difference between an initial gas supply volume and an actual gas supply volume of the emergency devices. The initial gas supply volume refers to a total amount of gas that the emergency devices can provide under full load. The actual gas supply volume refers to an amount of gas that the emergency devices have already provided to the gas emergency regions.

In some embodiments, the smart gas pipeline network safety management platform 130 may determine movement paths of the emergency devices based on the weighted distances 441 between different gas emergency regions. For example, the emergency devices may move to the corresponding gas emergency regions in an ascending order of the weighted distances.

In some embodiments, the smart gas pipeline network safety management platform 130 may also determine start locations, end locations, the movement paths, and operating time of the emergency devices in different gas emergency regions based on the weighted distances 441 between the different gas emergency regions and the device data 442. The operating time of the emergency devices in different gas emergency regions may be determined based on the emergency gas supply time of the emergency regions. More descriptions regarding the emergency gas supply time may be found in the preceding descriptions.

The start locations refer to initial installation locations of the emergency devices in the gas emergency regions.

The end locations refer to final installation locations of the emergency devices in the gas emergency regions.

The movement paths refer to routes that the emergency devices take to move between installation locations in the gas emergency regions in a chronological order.

In some embodiments, the smart gas pipeline network safety management platform 130 may determine the dynamic deployment scheme based on the gas installation locations, the device data, etc. More descriptions regarding the embodiment may be found in the related descriptions of FIG. 5.

In some embodiments of the present disclosure, by assigning different weighted distances between different gas emergency regions, the dynamic deployment scheme for the emergency devices can be easily determined, thereby avoiding the situation of insufficient gas supply.

Figure 5:
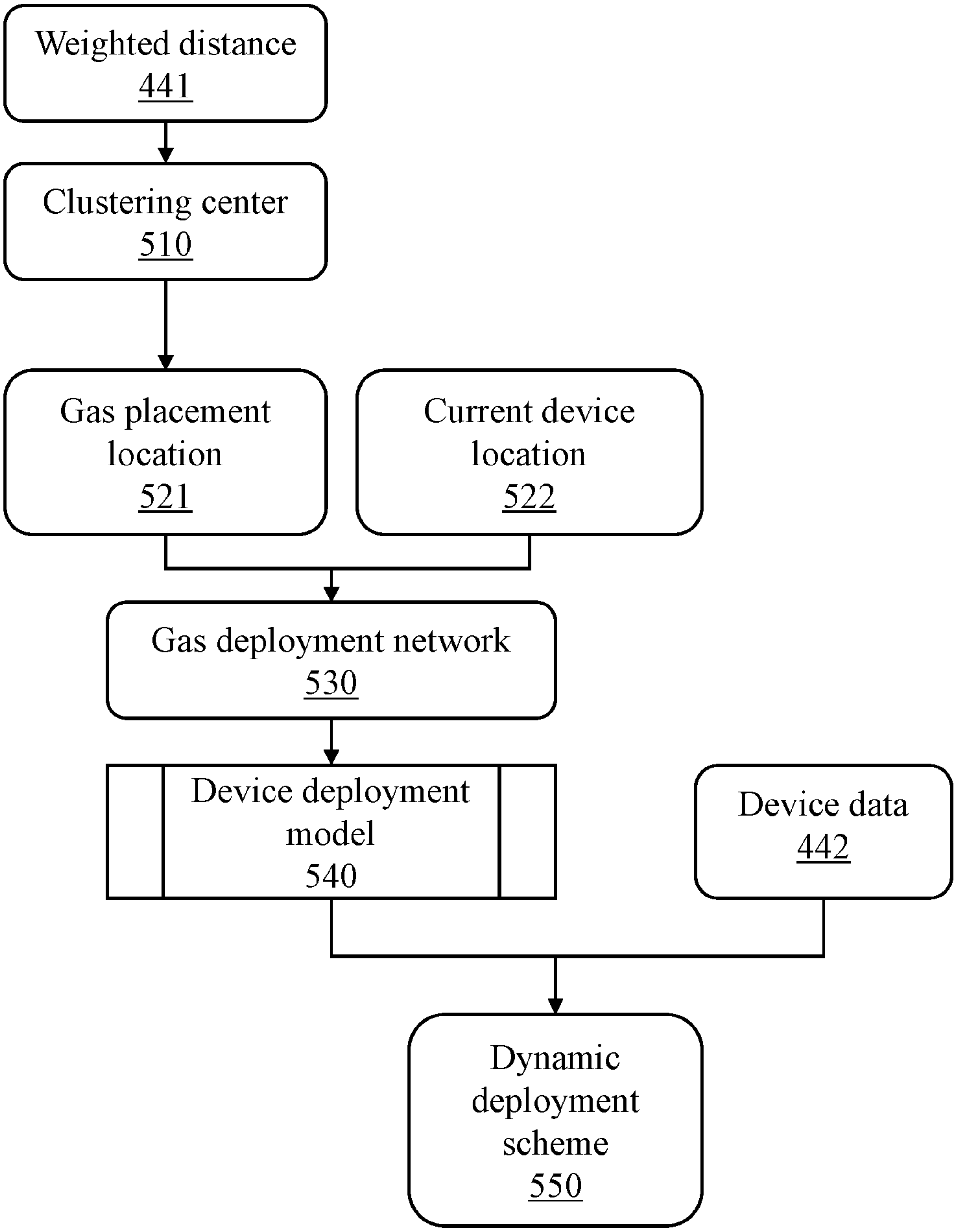
FIG. 5 is another schematic diagram illustrating a process for determining a dynamic deployment scheme according to some embodiments of the present disclosure.

FIG. 5 is a schematic diagram illustrating a process for determining a dynamic deployment scheme according to some embodiments of the present disclosure.

In some embodiments, the smart gas pipeline network safety management platform 130 may determine gas placement locations 521 based on the weighted distances 441, and determine a dynamic deployment scheme 550 for the emergency devices based on the gas placement locations 521 and the device data 422.

More descriptions regarding the weighted distances and the device data may be found in the related descriptions of FIG. 4.

The gas placement locations 521 refer to installation locations of the emergency devices in the gas emergency regions. The gas placement locations 521 may be installed at any location within respective gas emergency region, or at a center of a specific range of points consisting of the plurality of gas emergency regions, etc.

The gas placement locations 521 may be determined in various ways. In some embodiments, the smart gas pipeline network safety management platform 130 may group the plurality of the gas emergency regions based on various approaches, such as manual analysis, machine modeling, etc., and determine the corresponding gas placement locations 521 based on the grouped gas emergency regions. For example, a center point of each group of gas emergency regions may be determined as the gas placement location 521.

In some embodiments, the smart gas pipeline network safety management platform 130 may determine a clustering center 510 by clustering the gas emergency regions based on the weighted distances, and determine the placement locations 521 of emergency devices based on a location of the clustering center 510.

The clustering center 510 refers to a center point of a gas emergency region cluster. The gas emergency region cluster refers to one or more gas emergency region clusters obtained after clustering the gas emergency regions with a clustering algorithm.

In some embodiments, the smart gas pipeline network safety management platform 130 may determine the clustering center by clustering the gas emergency regions based on weighted regions. The corresponding clustering center may be a center of a physical location of the gas emergency region cluster. In some embodiments, the clustering algorithm may include, but is not limited to, a K-means clustering algorithm, a hierarchical clustering algorithm, a Gaussian clustering algorithm, etc.

In some embodiments, the smart gas pipeline network safety management platform 130 may determine the location of the clustering center 510 as the gas placement location of the emergency device.

In some embodiments of the present disclosure, clustering enables one or more gas emergency regions with high correlation (e.g., close physical distance) to be divided into the same gas emergency region cluster. The same gas emergency region cluster may share the emergency devices to avoid excessive deployment of the emergency devices and ensure gas supply while conserving resources.

In some embodiments, the smart gas pipeline network safety management platform 130 may select same or similar historical gas installation location and historical device data from the historical data based on the gas installation locations 510 and the device data 442, and determine the dynamic deployment scheme 550 corresponding to the historical gas installation locations and the historical device data as the dynamic deployment scheme 550 for the emergency devices.

In some embodiments, the smart gas pipeline network safety management platform 130 may determine a gas deployment network 530 based on the placement locations 521 of the emergency devices and current device locations 522 of the emergency devices, and determine the dynamic deployment scheme 550 through a device deployment model 540 based on the gas deployment network 530.

The current device location 522 refers to device locations of the emergency devices at the current time.

The gas deployment network 530 may be configured to reflect information related to gas deployment. For example, the gas deployment network 530 may include information such as the current device locations and device features of the gas emergency devices, the placement locations and placement location features, and a connectivity between different locations.

The placement location features may be gas demand features reflecting the placement locations of the emergency devices. For example, the placement location features may include the gas demand, the emergency gas supply time, etc. The gas demand refers to gas demand within the gas emergency regions corresponding to the gas placement locations.

The device features may be features reflecting features of the emergency devices. For example, the device features may include the gas supply capacities of the emergency devices.

In some embodiments, the placement location features and the device features may be obtained based on the smart gas object platform, and sent to the smart gas data center through the smart gas sensor network platform. More descriptions may be found in FIG. 1 and related descriptions thereof.

More descriptions regarding the gas supply capacities and emergency gas supply time may be found in FIG. 4 and related descriptions thereof.

In some embodiments, the gas deployment network 530 may be determined based on the gas placement locations 521 and the current device locations 522. The gas deployment network 530 may be a graph structure including nodes and edges.

Nodes may characterize the gas placement locations and the device locations. Node features may reflect information related to the nodes. The node features may vary for different types of nodes. For example, nodes characterizing the gas placement locations may include features such as the gas demand and the emergency gas supply time. Nodes characterizing the device locations may include features such as the gas supply capacities of the emergency devices.

In some embodiments, the nodes characterizing the gas placement locations may also include pressure features of the gas emergency regions in which the gas placement locations are located of at least one continuous time point.

The pressure features reflect pressure features of gas pipeline segments within the gas emergency regions. For example, a pressure feature may include a pressure change of the gas pipeline segment of the at least one continuous time point.

In some embodiments of the present disclosure, the pressure features of different gas emergency regions may vary, and the pressure features may describe stability of gas transportation and usage in the gas emergency regions, so that a vehicle deployment scheme may be determined by considering the pressure features, thereby improving the reliability of the final scheme.

The edges may characterize routes between different device locations, different placement locations, and between the device locations and the placement locations. For example, if there is a direct route between a device location A and a placement location B, there may be an edge between the device location A and the placement location B.

In some embodiments, edge features may include physical distances between different device locations, different placement locations, and between the device locations and/or the placement locations.

In some embodiments of the present disclosure, the gas deployment network enables visual processing of a dispatch process of the emergency devices, allowing for more reasonable allocation of the emergency devices.

The device deployment model 540 may be configured to determine the deployment scheme for the emergency devices. In some embodiments, the device deployment model 540 may be a graph neural network (GNN) model, or other graph model, such as a graph convolution neural networks (GCN) model, etc., or by adding other processing layers to the GNN, modifying processing approaches thereof, etc.

In some embodiments, an input of the device deployment model 540 may include the gas deployment network 530, and an output of the device deployment model 540 may include the dynamic deployment scheme 550.

In some embodiments, a movement scheme of the emergency devices may be obtained by calculating the relationship between the time of arrival of the emergency gas devices at the placement locations and the emergency gas supply time, and the dynamic deployment scheme for the emergency gas supply devices may be determined based on the movement scheme for the emergency devices and the placement locations of the emergency devices.

In some embodiments, the device deployment model may be obtained by training second training samples with second labels. The second training samples may be historical gas deployment networks determined based on historical data. Nodes and node features, and edges and edge features of the historical gas deployment networks may be similar to those of the gas deployment network. The second labels may be actual dynamic deployment schemes corresponding to the second training samples. The second labels may be obtained based on manual labeling. For example, the actual dynamic deployment schemes may be obtained by manually analyzing time of movement of the emergency devices to the gas placement locations and the emergency gas supply time. The actual dynamic deployment schemes may be used as the second labels.

In some embodiments, the smart gas pipeline network safety management platform 130 may obtain the device deployment model by training an initial device deployment model based on a large number of second training samples with labels. For example, the second training samples may be input into the initial device deployment model, and a loss function may be constructed based on outputs of the initial deployment model and the second labels. Parameters of the initial deployment model may be iteratively updated based on the loss function through gradient descent or other approaches. The iteration may be stopped when a training end condition is satisfied, and a trained device deployment model may be obtained. The training end condition may include that the loss function converges, a count of iterations reaches a threshold, etc.

In some embodiments of the present disclosure, the effects of the gas installation locations and the device locations are considered while determining the dynamic deployment scheme through the device deployment model, which can make the dynamic deployment scheme more consistent with the actual situation, and improve the accuracy of the determined dynamic deployment scheme.

In some embodiments of the present disclosure, the dynamic deployment scheme for the emergency devices can be determined based on the gas installation locations and the device data, which can dispatch gas resources by the deployment of the emergency devices, better satisfying the gas demand of gas users and improving use experience of the gas users. Meanwhile, the gas supply and demand can be guaranteed as much as possible, reducing the influence of insufficient gas supply on the gas users, thereby improving user satisfaction, saving costs, and enhancing gas supply efficiency.

One or more embodiments of the present disclosure further provide a device for presetting gas emergency devices. The device may comprise a processor configured to implement the method for presetting the gas emergency devices as described in any of the above embodiments.

One or more embodiments of the present disclosure further provide a non-transitory computer-readable storage medium comprising computer instructions that, when read by a computer, may direct the computer to implement the method for presetting the gas emergency devices as described in any of the above embodiments.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for presetting emergency devices of smart gas, implemented by a smart gas pipeline network safety management platform of an Internet of Things (IoT) system of smart gas, comprising:

determining gas supply and demand features based on node data and downstream user features of a gas pipeline network, the node data being obtained based on sensors;

determining a plurality of gas emergency regions based on the gas supply and demand features;

continuously obtaining location data and carrying data of a plurality of emergency devices, the plurality of emergency devices being distributed in a distributed manner;

determining weighted distances between different gas emergency regions, the weighted distances being used to measure a correlation between different gas emergency regions;

determining gas placement locations based on the weighted distances;

determining a dynamic deployment scheme for the plurality of emergency devices based on the gas placement locations and device data, the dynamic deployment scheme including locations of the plurality of emergency devices of at least one time point, and the device data being data related to the plurality of emergency devices, including locations and gas supply capacities of the plurality of emergency devices; and generating a movement instruction based on the dynamic deployment scheme, and sending the movement instruction to the plurality of emergency devices.

2. The method of claim 1, wherein the determining a plurality of gas emergency regions based on the gas supply and demand features includes:

determining a regional division of the gas pipeline network; and determining the plurality of gas emergency regions based on the regional division and the gas supply and demand features.

3. An Internet of Things (IoT) system for emergency device management of smart gas, wherein the IoT system includes a smart gas user platform, a smart gas service platform, a smart gas pipeline network safety management platform, a smart gas sensor network platform, and a smart gas pipeline network object platform;

the smart gas pipeline network safety management platform is configured to:

determine gas supply and demand features based on node data and downstream user features of a gas pipeline network, the node data being obtained based on sensors;

determine a plurality of gas emergency regions based on the gas supply and demand features;

continuously obtain location data and carrying data of a plurality of emergency devices, the plurality of emergency devices being distributed in a distributed manner;

determine weighted distances between different gas emergency regions, the weighted distances being used to measure a correlation between different gas emergency regions;

determine gas placement locations based on the weighted distances;

determine a dynamic deployment scheme for the plurality of emergency devices based on the gas placement locations and device data, the dynamic deployment scheme including locations of the plurality of emergency devices of at least one time point, and the device data being data related to the plurality of emergency devices, including locations and gas supply capacities of the plurality of emergency devices; and generate a movement instruction based on the dynamic deployment scheme, and send the movement instruction to the plurality of emergency devices.

4. The IoT system of claim 3, wherein the smart gas pipeline network safety management platform includes a smart gas pipeline network risk assessment management sub-platform and a smart gas data center;

the smart gas pipeline network safety management platform performs information interaction with the smart gas service platform and the smart gas pipeline network sensor network platform through the smart gas data center.

5. The IoT system of claim 4, wherein the smart gas pipeline network safety management platform is further configured to:

determine a regional division of the gas pipeline network; and determine the plurality of gas emergency regions based on the regional division and the gas supply and demand features.

6. A non-transitory computer-readable storage medium, comprising computer instructions that, when read by a computer, direct the computer to implement the method for presetting the emergency devices of smart gas of claim 1.

* * * * *